US012098328B2

(12) United States Patent
Darcy et al.

(10) Patent No.: US 12,098,328 B2
(45) Date of Patent: Sep. 24, 2024

(54) PROCESSES AND SYSTEMS FOR PRODUCING HYDROCARBON FUELS HAVING HIGH CARBON CONVERSION EFFICIENCY

(71) Applicant: DG Fuels, LLC, Washington, DC (US)

(72) Inventors: Michael C. Darcy, Washington, DC (US); Michael W. Horner, West Chester, OH (US); Lyman Joseph Frost, Idaho Falls, ID (US); Robert L. Freerks, Aurora, CO (US); Juan Francisco Pearcy Salinas, Concepcion (CL); Daniel Benjamin Montoto, Washington, DC (US)

(73) Assignee: DG FUELS, LLC, Washington, DC (US)

( * ) Notice: Subject to any disclaimer, the term of this patent is extended or adjusted under 35 U.S.C. 154(b) by 11 days.

(21) Appl. No.: 17/935,382

(22) Filed: Sep. 26, 2022

(65) Prior Publication Data
US 2023/0119589 A1  Apr. 20, 2023

Related U.S. Application Data

(60) Provisional application No. 63/256,264, filed on Oct. 15, 2021.

(51) Int. Cl.
*C10G 2/00* (2006.01)
*B01D 53/14* (2006.01)
(Continued)

(52) U.S. Cl.
CPC ........... *C10G 2/34* (2013.01); *B01D 53/1475* (2013.01); *B01D 53/18* (2013.01); *C01B 3/068* (2013.01);
(Continued)

(58) Field of Classification Search
CPC .. C10G 2/34; C10G 69/10; C10G 2300/1014; C10G 2300/1022; C10G 2300/4081;
(Continued)

(56) References Cited

U.S. PATENT DOCUMENTS 6,652,627 B1   11/2003   Tonkovich et al.
6,969,505 B2   11/2005   Tonkovich et al.
(Continued)

FOREIGN PATENT DOCUMENTS

WO   2018134853 A1   7/2018
WO   2021087618 A1   5/2021
WO   2023056088 A1   4/2023

OTHER PUBLICATIONS

International Application No. PCT/US2022/044719, International Search Report and Written Opinion, Mailed on Feb. 1, 2023, 12 pages.
(Continued)

*Primary Examiner* — Prem C Singh
*Assistant Examiner* — Francis C Campanell
(74) *Attorney, Agent, or Firm* — Kilpatrick Townsend & Stockton LLP

(57) ABSTRACT

The present disclosure relates to a processes and systems for producing fuels from biomass with high carbon conversion efficiency. The processes and systems described herein provide a highly efficient process for producing hydrocarbons from biomass with very low Green House Gas (GHG) emissions using a specific combination of components, process flows, and recycle streams. The processes and systems described herein provide a carbon conversion efficiency greater than 95% with little to no GHG in the flue gas due to the novel arrangement of components and utilizes renewable energy to provide energy to some components. The system reuses water and carbon dioxide produced in the
(Continued)

process flows and recycles naphtha and tail gas streams to other units in the system for additional conversion to syngas to produce hydrocarbon-based fuels.

18 Claims, 5 Drawing Sheets

(51) Int. Cl.
*B01D 53/18* (2006.01)
*C01B 3/06* (2006.01)
*C01B 3/12* (2006.01)
*C10G 69/10* (2006.01)
*C10J 3/82* (2006.01)
*C10K 3/02* (2006.01)
*C10L 1/04* (2006.01)

(52) U.S. Cl.
CPC ............... *C01B 3/12* (2013.01); *C10G 69/10* (2013.01); *C10J 3/82* (2013.01); *C10K 3/026* (2013.01); *C10L 1/04* (2013.01); C01B 2203/0283 (2013.01); C01B 2203/0415 (2013.01); C01B 2203/0475 (2013.01); C01B 2203/062 (2013.01); C01B 2203/065 (2013.01); C10G 2300/1014 (2013.01); C10G 2300/1022 (2013.01); C10G 2300/4081 (2013.01); C10J 2300/092 (2013.01); C10J 2300/1618 (2013.01); C10J 2300/1659 (2013.01); C10J 2300/1684 (2013.01); C10J 2300/1807 (2013.01); C10L 2200/0469 (2013.01); C10L 2200/0492 (2013.01); C10L 2290/04 (2013.01); C10L 2290/10 (2013.01); C10L 2290/42 (2013.01); C10L 2290/545 (2013.01)

(58) Field of Classification Search
CPC .... B01D 53/1475; B01D 53/18; C01B 3/068; C01B 3/12; C01B 2203/0283; C01B 2203/0415; C01B 2203/0475; C01B 2203/062; C01B 2203/065; C10J 3/82; C10J 2300/092; C10J 2300/1618; C10J 2300/1659; C10J 2300/1684; C10J 2300/1807; C10K 3/026; C10L 1/04; C10L 2200/0469; C10L 2200/0492; C10L 2290/04; C10L 2290/10; C10L 2290/42; C10L 2290/545
USPC ........................................................ 585/242
See application file for complete search history.

(56) References Cited

U.S. PATENT DOCUMENTS

| | | |
|---|---|---|
| 6,989,134 B2 | 1/2006 | Tonkovich et al. |
| 7,000,427 B2 | 2/2006 | Mathias et al. |
| 7,014,835 B2 | 3/2006 | Mathias et al. |
| 7,029,647 B2 | 4/2006 | Tonkovich et al. |
| 7,084,180 B2 | 8/2006 | Wang et al. |
| 7,220,390 B2 | 5/2007 | Tonkovich et al. |
| 7,226,574 B2 | 6/2007 | Long et al. |
| 7,250,074 B2 | 7/2007 | Tonkovich et al. |
| 7,250,151 B2 | 7/2007 | Tonkovich et al. |
| 7,255,845 B2 | 8/2007 | Tonkovich et al. |
| 7,294,734 B2 | 11/2007 | Brophy et al. |
| 7,305,850 B2 | 12/2007 | Tonkovich et al. |
| 7,307,104 B2 | 12/2007 | Qiu et al. |
| 7,326,394 B2 | 2/2008 | Yang et al. |
| 7,402,719 B2 | 7/2008 | Brophy et al. |
| 7,404,936 B2 | 7/2008 | Mazanec et al. |
| 7,405,338 B2 | 7/2008 | Brophy et al. |
| 7,422,910 B2 | 9/2008 | Fitzgerald et al. |
| 7,442,360 B2 | 10/2008 | Tonkovich et al. |
| 7,445,650 B2 | 11/2008 | Weil et al. |
| 7,459,508 B2 | 12/2008 | Fitzgerald et al. |
| 7,468,455 B2 | 12/2008 | Mazanec et al. |
| 7,470,408 B2 | 12/2008 | Tonkovich et al. |
| 7,485,671 B2 | 2/2009 | Qiu et al. |
| 7,507,274 B2 | 3/2009 | Tonkovich et al. |
| 7,552,642 B2 | 6/2009 | Neagle et al. |
| 7,566,441 B2 | 7/2009 | Daly et al. |
| 7,569,195 B2 | 8/2009 | Rogers et al. |
| 7,610,775 B2 | 11/2009 | Tonkovich et al. |
| 7,622,509 B2 | 11/2009 | Tonkovich et al. |
| 7,641,865 B2 | 1/2010 | Tonkovich et al. |
| 7,722,833 B2 | 5/2010 | Wang et al. |
| 7,722,854 B2 | 5/2010 | Watson et al. |
| 7,744,829 B2 | 6/2010 | Brophy et al. |
| 7,745,667 B2 | 6/2010 | Deshmukh et al. |
| 7,754,935 B2 | 7/2010 | Brophy et al. |
| 7,780,944 B2 | 8/2010 | Mathias et al. |
| 7,781,548 B2 | 8/2010 | Fitzgerald et al. |
| 7,807,113 B2 | 10/2010 | Rogers et al. |
| 7,816,411 B2 | 10/2010 | Tonkovich et al. |
| 7,820,445 B2 | 10/2010 | Jarosch et al. |
| 7,820,725 B2 | 10/2010 | Tonkovich et al. |
| 7,829,602 B2 | 11/2010 | Litt et al. |
| 7,847,138 B2 | 12/2010 | Tonkovich et al. |
| 7,874,432 B2 | 1/2011 | Yang et al. |
| 7,896,935 B2 | 3/2011 | Tonkovich et al. |
| 7,923,592 B2 | 4/2011 | Tonkovich et al. |
| 7,931,875 B2 | 4/2011 | Tonkovich et al. |
| 7,959,880 B2 | 6/2011 | Tonkovich et al. |
| 7,981,831 B2 | 7/2011 | Yang et al. |
| 7,999,144 B2 | 8/2011 | Tonkovich et al. |
| 8,029,604 B2 | 10/2011 | Tonkovich et al. |
| 8,029,748 B2 | 10/2011 | Mazanec et al. |
| 8,048,383 B2 | 11/2011 | Tonkovich et al. |
| 8,062,623 B2 | 11/2011 | Daly et al. |
| 8,100,996 B2 | 1/2012 | Simmons et al. |
| 8,106,249 B2 | 1/2012 | Brophy et al. |
| 8,122,909 B2 | 2/2012 | Tonkovich et al. |
| 8,124,177 B2 | 2/2012 | Tonkovich et al. |
| 8,188,153 B2 | 5/2012 | Wang et al. |
| 8,206,597 B2 | 6/2012 | Yang et al. |
| 8,221,528 B2 | 7/2012 | Tonkovich et al. |
| 8,252,245 B2 | 8/2012 | Tonkovich et al. |
| 8,277,773 B2 | 10/2012 | Watson et al. |
| 8,298,491 B2 | 10/2012 | Tonkovich et al. |
| 8,338,325 B2 | 12/2012 | Brophy et al. |
| 8,378,163 B2 | 2/2013 | Ida et al. |
| 8,383,054 B2 | 2/2013 | Tonkovich et al. |
| 8,383,872 B2 | 2/2013 | Tonkovich et al. |
| 8,450,381 B2 | 5/2013 | Rogers et al. |
| 8,460,411 B2 | 6/2013 | Rogers, Jr. et al. |
| 8,492,164 B2 | 7/2013 | Fitzgerald et al. |
| 8,497,308 B2 | 7/2013 | Tonkovich et al. |
| 8,517,717 B2 | 8/2013 | Hesse et al. |
| 8,524,927 B2 | 9/2013 | Mazanec et al. |
| 8,557,186 B2 | 10/2013 | Tonkovich et al. |
| 8,569,202 B2 | 10/2013 | Watson et al. |
| 8,580,211 B2 | 11/2013 | Tonkovich et al. |
| 8,646,472 B2 | 2/2014 | Tonkovich et al. |
| 8,648,006 B2 | 2/2014 | Daly et al. |
| 8,685,365 B2 | 4/2014 | Mathias et al. |
| 8,703,984 B2 | 4/2014 | Mazanec et al. |
| 8,721,974 B2 | 5/2014 | Tonkovich et al. |
| 8,747,656 B2 | 6/2014 | Tonkovich et al. |
| 8,747,805 B2 | 6/2014 | Tonkovich et al. |
| 8,802,039 B2 | 8/2014 | Neagle et al. |
| 8,869,830 B2 | 10/2014 | Tonkovich et al. |
| 9,006,298 B2 | 4/2015 | LeViness et al. |
| 9,011,781 B2 | 4/2015 | Long et al. |
| 9,023,900 B2 | 5/2015 | Wang et al. |
| 9,101,890 B2 | 8/2015 | Tonkovich et al. |
| 9,108,904 B2 | 8/2015 | Brophy et al. |
| 9,134,079 B2 | 9/2015 | Tonkovich et al. |
| 9,150,494 B2 | 10/2015 | Tonkovich et al. |
| 9,174,387 B2 | 11/2015 | Luzenski et al. |
| 9,192,929 B2 | 11/2015 | Tonkovich et al. |
| 9,278,330 B2 | 3/2016 | Deshmukh et al. |

(56) References Cited

U.S. PATENT DOCUMENTS

| | | |
|---|---|---|
| 9,359,270 B2 | 6/2016 | Daly et al. |
| 9,359,271 B2 | 6/2016 | LeViness et al. |
| 9,365,765 B2 | 6/2016 | LeViness et al. |
| 9,381,501 B2 | 7/2016 | Daly et al. |
| 9,441,777 B2 | 9/2016 | Mathias et al. |
| 9,452,407 B2 | 9/2016 | Tonkovich et al. |
| 9,452,408 B2 | 9/2016 | Rogers, Jr. et al. |
| 9,453,165 B2 | 9/2016 | Wang et al. |
| 9,475,026 B2 | 10/2016 | Fitzgerald et al. |
| 9,500,414 B2 | 11/2016 | Tonkovich et al. |
| 9,523,040 B2 | 12/2016 | Daly et al. |
| 9,527,057 B2 | 12/2016 | Tonkovich et al. |
| 9,643,151 B2 | 5/2017 | Tonkovich et al. |
| 9,656,247 B2 | 5/2017 | Daly et al. |
| 9,676,623 B2 | 6/2017 | Perry et al. |
| 9,695,368 B2 | 7/2017 | Tonkovich et al. |
| 9,707,546 B2 | 7/2017 | Richard et al. |
| 9,725,385 B2 | 8/2017 | Steynberg et al. |
| 9,752,831 B2 | 9/2017 | Tonkovich et al. |
| 9,822,049 B2 | 11/2017 | Greager et al. |
| 9,893,364 B2 | 2/2018 | Long et al. |
| 9,908,093 B2 | 3/2018 | Simmons et al. |
| 9,926,496 B2 | 3/2018 | Tonkovich et al. |
| 9,950,975 B2 | 4/2018 | Steynberg et al. |
| 9,962,697 B2 | 5/2018 | Tonkovich et al. |
| 9,994,763 B2 | 6/2018 | LeViness et al. |
| 10,065,911 B2 | 9/2018 | Greager et al. |
| 10,155,213 B2 | 12/2018 | Tonkovich et al. |
| 10,159,954 B2 | 12/2018 | Luzenski et al. |
| 10,232,455 B2 | 3/2019 | Yuschak et al. |
| 10,335,759 B2 | 7/2019 | Ramler et al. |
| 10,358,604 B2 | 7/2019 | Harris et al. |
| 10,435,318 B2 | 10/2019 | Lea et al. |
| 10,737,234 B2 | 8/2020 | Luzenski et al. |
| 10,752,843 B2 | 8/2020 | Harris et al. |
| 10,843,161 B2 | 11/2020 | Tonkovich et al. |
| 10,851,035 B2 | 12/2020 | Greager et al. |
| 10,889,762 B2 | 1/2021 | Steynberg et al. |
| 11,173,483 B2 | 11/2021 | Deshmukh et al. |
| 11,247,953 B2 | 2/2022 | Greager et al. |
| 11,572,512 B2 | 2/2023 | Greager et al. |
| 11,578,281 B2 | 2/2023 | Greager et al. |
| 11,612,874 B2 | 3/2023 | Ramler et al. |
| 11,618,860 B2 | 4/2023 | Greager et al. |
| 11,661,553 B2 | 5/2023 | Harris et al. |
| 11,717,812 B2 | 8/2023 | Leonarduzzi et al. |
| 11,739,014 B2 | 8/2023 | Lea et al. |
| 11,834,614 B2 | 12/2023 | Greager et al. |
| 11,840,668 B2 | 12/2023 | Greager et al. |
| 2007/0154360 A1 | 7/2007 | Daly et al. |
| 2007/0246106 A1 | 10/2007 | Tonkovich et al. |
| 2007/0298486 A1 | 12/2007 | Arora et al. |
| 2008/0214884 A1 | 9/2008 | Daly et al. |
| 2009/0004076 A1 | 1/2009 | Brophy et al. |
| 2009/0010823 A1 | 1/2009 | Mazanec et al. |
| 2009/0012341 A1 | 1/2009 | Brophy et al. |
| 2009/0074627 A1 | 3/2009 | Fitzgerald et al. |
| 2009/0075156 A1 | 3/2009 | Long et al. |
| 2009/0196805 A1 | 8/2009 | Tonkovich et al. |
| 2009/0252658 A1 | 10/2009 | Ramler et al. |
| 2010/0196226 A1 | 8/2010 | Watson et al. |
| 2010/0258198 A1 | 10/2010 | Tonkovich et al. |
| 2010/0267993 A1 | 10/2010 | Deshmukh et al. |
| 2010/0300550 A1 | 12/2010 | Mathias et al. |
| 2011/0039955 A1 | 2/2011 | Jarosch et al. |
| 2011/0147665 A1 | 6/2011 | Neagle et al. |
| 2011/0152597 A1 | 6/2011 | Brophy et al. |
| 2011/0158858 A1 | 6/2011 | Alves |
| 2011/0182804 A1 | 7/2011 | Long et al. |
| 2012/0132290 A1 | 5/2012 | Tonkovich et al. |
| 2012/0138151 A1 | 6/2012 | Tonkovich et al. |
| 2012/0171517 A1 | 7/2012 | Yuschak et al. |
| 2012/0302811 A1 | 11/2012 | Long et al. |
| 2013/0023407 A1 | 1/2013 | Watson et al. |
| 2013/0034478 A1 | 2/2013 | Doty |
| 2013/0052149 A1 | 2/2013 | Tonkovich et al. |
| 2013/0186607 A1 | 7/2013 | Mathias et al. |
| 2014/0045954 A1 | 2/2014 | LeViness et al. |
| 2014/0109638 A1 | 4/2014 | Aelion et al. |
| 2014/0109976 A1 | 4/2014 | Mathias et al. |
| 2014/0246625 A1 | 9/2014 | Tonkovich et al. |
| 2014/0264175 A1 | 9/2014 | Perry et al. |
| 2014/0272734 A1 | 9/2014 | Braun et al. |
| 2014/0291204 A1 | 10/2014 | Tonkovich et al. |
| 2014/0318794 A1 | 10/2014 | LeViness et al. |
| 2014/0332081 A1 | 11/2014 | Fitzgerald et al. |
| 2016/0289545 A1 | 10/2016 | LeViness et al. |
| 2017/0189885 A1 | 7/2017 | Tonkovich et al. |
| 2017/0327444 A1 | 11/2017 | Steynberg et al. |
| 2019/0030508 A1 | 1/2019 | Luzenski et al. |
| 2019/0076948 A1 | 3/2019 | Yuschak et al. |
| 2020/0017422 A1 | 1/2020 | Kramer et al. |
| 2021/0292665 A1* | 9/2021 | Chishima ................ C25B 15/08 |
| 2022/0177796 A1 | 6/2022 | Greager et al. |
| 2023/0347323 A1 | 11/2023 | Leonarduzzi et al. |
| 2023/0382821 A1 | 11/2023 | Greager et al. |
| 2023/0392090 A1 | 12/2023 | Greager et al. |

OTHER PUBLICATIONS

International Application No. PCT/US2022/044719, "Invitation to Pay Additional Fees and, Where Applicable, Protest Fee", Dec. 14, 2022, 2 pages.

Gruber et al., Fischer-Tropsch Products from Biomass-derived Syngas and Renewable Hydrogen, Biomass Conversion and Biorefinery, vol. 11, Dec. 2021, pp. 2281-2292.

International Application No. PCT/US2022/044719, International Preliminary Report on Patentability mailed Apr. 25, 2024, 9 pages.

* cited by examiner

PROCESSES AND SYSTEMS FOR PRODUCING HYDROCARBON FUELS HAVING HIGH CARBON CONVERSION EFFICIENCY

CROSS-REFERENCE TO RELATED APPLICATION

This application claims the benefit of and priority to U.S. Provisional Application No. 63/256,264, filed Oct. 15, 2021, the disclosure of which is hereby incorporated by reference in its entirety.

FIELD OF THE INVENTION

The present disclosure relates to processes and systems for processing renewable feedstocks to produce hydrocarbon-based fuels. More specifically, the present disclosure provides a highly efficient process for producing hydrocarbon-based fuels from biomass with very low Green House Gas (GHG) emissions using a specific combination of components and process flows.

BACKGROUND

In an effort to reduce dependence on petroleum energy sources and reduce greenhouse gas emissions, several studies have been done to explore alternative, non-petroleum based processes to produce liquid fuels. These alternative studies include the production of synthetic liquid hydrocarbons from biomass, coal, and natural gas using a synthesis gas ("syngas") intermediate. These energy processes have emerged as viable options due to their capabilities to produce liquid fuels via domestically available sources of carbon based energy. A common feature of these synthetic processes, however, is the large amount of $CO_2$ emitted from the system.

Conventional processes for converting natural gas feeds into syngas typically include autothermal or steam methane reforming. The conversion of natural gas or biomass feeds into liquid fuels is referred to as gas to liquids (GTL) and biomass to liquids (BTL), respectively. The generic process includes converting the feed materials, e.g., biomass and/or natural gas, into a mixture of synthesis gas ("syngas," comprising $H_2$ and CO) for conversion into liquid hydrocarbons via the Fischer Tropsch process. The liquid hydrocarbons are subsequently upgraded, e.g., through distillation, hydrocracking, and/or isomerization, to form the final products (e.g., diesel or synthetic petroleum kerosene ("SPK")). In both feed conversion steps into synthesis gas, intermediate processing steps remove impurities and excess $CO_2$ which can be detrimental to the FT catalytic process for production of the final fuel products. Of particular concern are sulfur containing compounds, such as $H_2S$, COS, $SO_2$, or mercaptans, as sulfur irreversibly deactivates FT catalysts. Other non-desired contaminants such as $H_2O$ and $CO_2$ can also affect the FT catalyst performance via dilution of the primary synthesis reactants (e.g., $H_2$ and CO) and/or temporary deactivation due to oxidation of active metals. $H_2O$ is one of the products of the FT reaction and thus the presence of water affects the chemical equilibrium for the formation of desired hydrocarbon product. In order to optimize carbon efficiency (ratio of product carbon to feed carbon) several recycle loops are added to the process configuration.

A primary concern during hydrocarbon synthesis centers around maximizing the utilization of the input carbon from the feedstock, i.e., converting as much feed carbon into product carbon, while using an acceptable amount of energy (from any source) with acceptable environmental emissions, predominantly $CO_2$ emissions and produced water requiring treatment for trace contaminants. Currently, the collection and sequestration of $CO_2$ is based on the trade-off between the added energy for capture and compression of $CO_2$ for it to be sequestered, and the reduction of $CO_2$ emissions. However, these additional processing steps for reducing $CO_2$ emissions require additional energy and resources, which effectively increases energy consumption, and adds inefficiency to the hydrocarbon synthesis process as additional $CO_2$ gets captured and sequestered. Since the aforementioned capture, pressurization, and sequestration utilize energy; those steps can also increase greenhouse gas emissions thereby offsetting a portion of the benefit gathered from sequestration.

In view of the foregoing, the need exists for optimizing carbon conversion and reducing and/or removing $CO_2$ emissions from processes for producing hydrocarbon-based fuels.

SUMMARY OF THE INVENTION

Covered embodiments of the present disclosure are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

In some embodiments, the present disclosure provides a system for producing a hydrocarbon-based fuel. The system includes a biomass feedstock processing unit configured to remove waste from a feedstock to produce a processed feedstock; a gasification unit in communication with the biomass feedstock processing unit, wherein the gasification unit is configured to convert the processed feedstock into syngas comprising carbon dioxide, carbon monoxide, and hydrogen; a reactor downstream from the gasification unit, wherein the reactor is operated at suitable conditions to promote conversion of portions of the syngas to produce a proper ratio of hydrogen to CO; a scrubber in communication with the reformer, wherein the scrubber removes carbon dioxide from the syngas to produce a purified syngas having a hydrogen to carbon monoxide ratio of at least 1.5:1; a Fischer Tropsch reactor for receiving the purified syngas, wherein the Fischer Tropsch reactor converts the purified syngas into Fischer-Tropsch liquids, produced water, and tail gas; a water purification system to purify the produced water for electrolysis; and an electrolysis unit configured to receive the purified produced water from the Fischer Tropsch reactor, wherein the electrolysis unit converts the purified produced water into an oxygen stream and a hydrogen stream. A portion of the oxygen stream produced from the electrolysis unit is recycled to the gasification unit, a methane reformer, or combinations thereof. The system achieves at least 90% carbon conversion of the feedstock. In some embodiments, the system includes a reverse water-gas shift reactor. A portion of the carbon dioxide removed from the syngas in the scrubber is recycled to the reverse water-gas-shift reactor. In some embodiments, a portion of the hydrogen stream produced by the electrolysis unit is provided to the reverse water-gas shift reactor. The reverse water-gas shift reactor is configured to produce carbon monoxide that is supplied to the Fischer Tropsch reactor. In some embodiments, the syngas stream and the hydrogen stream are pressurized prior to being supplied to the Fischer Tropsch reactor. In some embodiments, the tail gas from the Fischer Tropsch reactor is recycled to the reformer. In some embodiments, the system includes a hydrocracker unit, a fractionation unit, or combinations configured to upgrade the Fischer-Tropsch liquids into various fuels, wherein a byproduct of the hydrocracker unit comprises tail gas, wherein a byproduct of the fractionation unit comprises naphtha. In some embodiments, the tail gas, naphtha, or both, are recycled to the reformer. In some embodiments, the system includes a flue gas scrubber configured to scrub any flue gas generated by the system. In some embodiments, the system includes a carbon dioxide treatment and compression system, wherein carbon dioxide produced from the scrubber and the flue gas scrubber is processed in the carbon dioxide treatment and compression system to produce a purified carbon dioxide stream, wherein the purified carbon dioxide stream is recycled to the reformer, the reverse water-gas shift reactor, a $CO_2$ electrolysis unit, or combinations thereof. In some embodiments, the feedstock comprises one or more of railroad ties, greasewood, corn stover, orchard prunings, forest thinnings, slash, switch grass, wood chips, lignin, and cellulosic material. In some embodiments, the feedstock comprises woody biomass. In some embodiments, the system includes a pre-reformer and an autothermal reforming unit or steam methane reformer configured to convert a natural gas feedstock into syngas. In some embodiments, the system includes a $CO_2$ electrolysis unit configured to convert $CO_2$ recovered from the system into carbon monoxide and $O_2$. In some embodiments, the $O_2$ from the $CO_2$ electrolysis may be sent to the gasifier, the reactor (e.g., a reformer), or other unit in the system using $O_2$ in its process. The carbon monoxide can be fed to the Fischer Tropsch reactor.

In some embodiments, the present disclosure provides a process for producing a hydrocarbon-based fuels. The process includes gasifying a biomass feedstock to produce a first crude syngas stream comprising carbon dioxide, hydrogen, and carbon monoxide; reforming the first crude syngas stream to produce a hydrogen-enriched syngas stream; separating carbon dioxide from the hydrogen-enriched syngas stream in a separation unit to produce a carbon dioxide stream and a purified syngas stream having a hydrogen to carbon monoxide ratio of at least 1.5:1; enriching the purified syngas with additional hydrogen obtained via water electrolysis; reacting the purified syngas stream and hydrogen enriched syngas stream in a Fischer Tropsch reactor to produce Fischer-Tropsch liquids, water, and tail gas; recycling a portion of the produced water from the Fischer Tropsch reactor to a water purification step and subsequently to an electrolysis unit; and electrolyzing the purified water in the electrolysis unit to produce an oxygen stream and a hydrogen stream. In some embodiments, the process includes purifying the carbon dioxide stream generated from the separation unit to produce a purified carbon dioxide stream. In some embodiments, the process includes recycling the purified carbon dioxide stream to a "dry" reforming unit, the reverse water-gas-shift reactor, or combinations thereof. In some embodiments, the process includes recycling a portion of the oxygen stream and a portion of the hydrogen stream to the gasification step, the dry reforming step, the Fischer Tropsch reactor, or combinations thereof. In some embodiments, the process includes recycling a portion of the hydrogen stream and a portion of the purified carbon dioxide stream to a reverse water-gas-shift reactor to produce carbon monoxide to augment the syngas in the Fischer Tropsch reactor, increase the carbon utilization and to produce additional Fischer-Tropsch liquids. In some embodiments, the process includes feeding the carbon monoxide produced from the reverse water-gas-shift reactor to the Fischer Tropsch reactor to augment syngas into the Fischer Tropsch reactor and produce additional Fischer-Tropsch liquids. In some embodiments, the process includes processing natural gas in a reforming unit to produce a second syngas stream that is supplied to the Fischer Tropsch reactor. In some embodiments, the electrolysis unit is powered by solar energy, wind energy, hydroelectric energy, off-peak grid power, nuclear power, or tidal energy. In some embodiments, the biomass feedstock comprises one or more of railroad ties, greasewood, corn stover, orchard prunings, forest thinnings, slash, switch grass, wood chips, lignin, and cellulosic material. In some embodiments, the process includes treating the water produced from the Fischer Tropsch reactor to produce a boiler-quality feed water, wherein the boiler-quality feed water is electrolyzed in the electrolysis unit.

Further aspects, objects, and advantages will become apparent upon consideration of the detailed description and figures that follow.

DETAILED DESCRIPTION

Introduction

Figure 1:
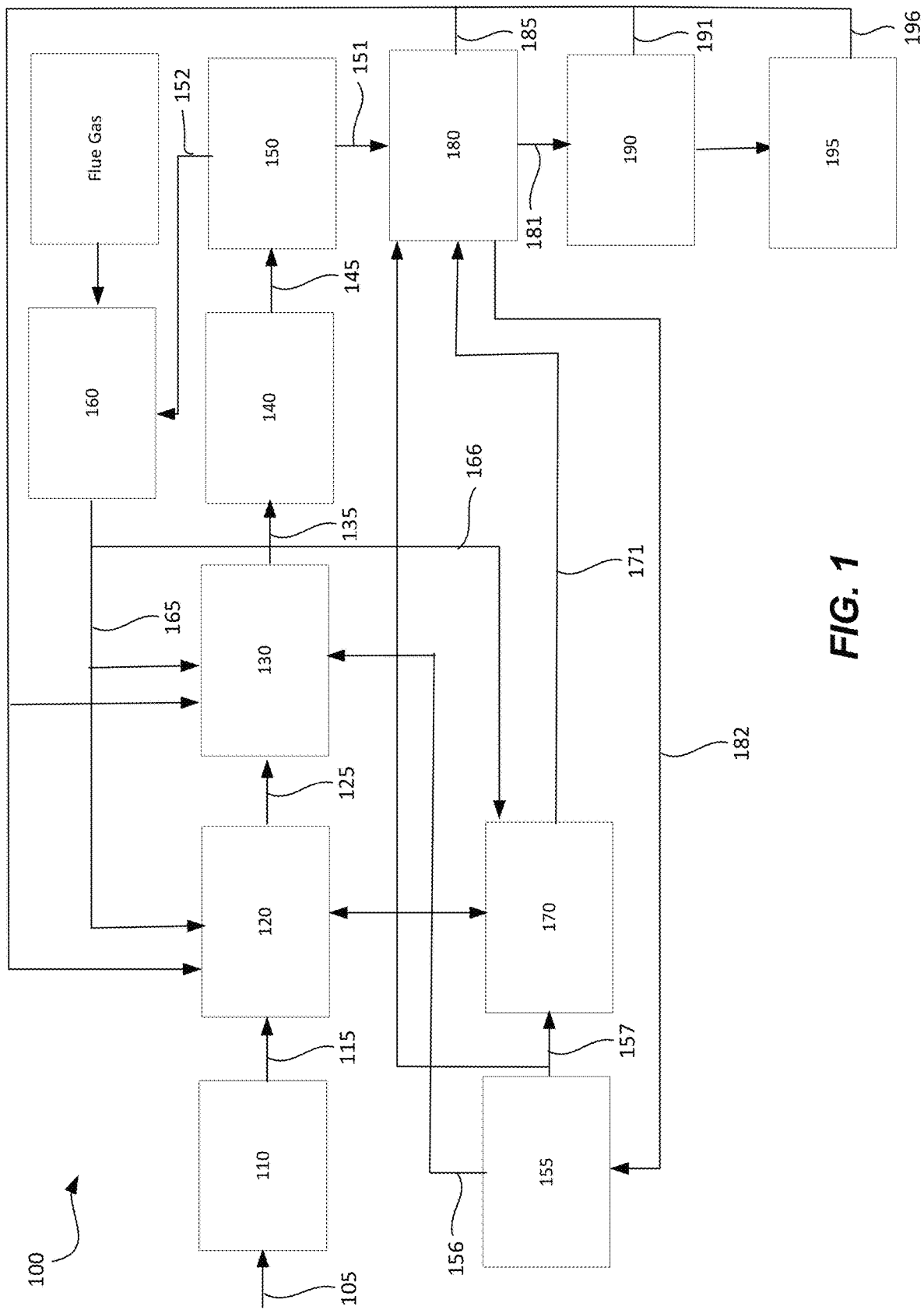
FIG. 1 shows a schematic diagram of a system for producing hydrocarbon fuels according to some embodiments of the present disclosure.

This present disclosure relates to processes and systems for producing fuels (e.g., liquid jet and/or diesel fuel) from biomass (e.g., forestry waste, railroad ties, greasewood, algae, agricultural wastes, municipal waste, etc.) and renewable hydrogen feedstocks. In some embodiments, the biomass comprises one or more of railroad ties, greasewood, corn stover, orchard prunings, forest thinnings, slash, switch grass, wood chips, lignin, and/or a cellulosic material. For example, forest waste and residues can be used for fuel production, which are typically treated as waste feedstocks that have smallest carbon footprint. Specifically, the processes and systems described herein provide a highly efficient process with high carbon utilization for producing hydrocarbons from biomass and renewable hydrogen and/or natural gas with very low Green House Gas (GHG) emissions using a specific combination of components and process flows described herein. In some embodiments, the processes and systems described herein provide a carbon conversion efficiency greater than 95% with little to no GHG in the flue gas due to the addition of renewable hydrogen and also to the novel arrangement of components and process flows. For example, the system beneficially reuses water and carbon dioxide produced in the process flows and recycles naphtha and tail gas streams to other units in the system (e.g., the partial oxidation reformer and/or biomass gasifier) for additional conversion to syngas to produce hydrocarbon-based fuels.

Conventional processes for producing syngas (e.g., $H_2$ and CO) for conversion into liquid hydrocarbons are inherently inefficient as they involve energy intensive $CO_2$ and water (e.g., wastewater) removal processes. In fact, these processes require additional energy and resources to convert or remove $CO_2$, thus adding inefficiencies and GHG emissions to the process. These conventional processes do not effectively convert feedstock into hydrocarbon-based fuels, because significant amounts of energy are needed to convert or remove $CO_2$ and to recycle water produced during the hydrocarbon synthesis process, which results in high amounts of additional emissions.

As described herein, the processes and systems described herein achieve an unexpectedly high carbon conversion efficiency with very little GHG due to the novel arrangement of components and process flows and, optionally, the addition of renewable hydrogen. In some embodiments, the processes and systems described provide a gasification process that convert feedstock into synthesis gas ("syngas") comprising carbon monoxide, carbon dioxide, and hydrogen, and the syngas is converted into hydrocarbon fuels using the Fisher-Tropsch process. The process may include processing a biomass in a gasification unit to form a first crude syngas stream, processing the syngas stream in a reactor (e.g., a reformer, water-gas-shift reactor, or a reverse water-gas-shift reactor) to produce a second syngas stream comprising hydrogen, carbon monoxide, and carbon dioxide, separating carbon dioxide from either or both the first and second crude syngas streams in a separation unit to form a carbon dioxide stream and a syngas stream that is substantially free of $CO_2$, purifying the carbon dioxide stream, and recycling the purified carbon dioxide to a dry reformer. The process may include reacting the syngas stream in a Fischer Tropsch reactor to produce the hydrocarbon product and water. In some embodiments, the process includes purifying the produced water and electrolyzing purified water and/or carbon dioxide in an electrolysis unit to produce hydrogen and/or carbon monoxide.

In some embodiments, the process may include converting carbon dioxide by feeding hydrogen from the electrolysis unit and the $CO_2$ in a reverse water-gas-shift reactor to form syngas. In some embodiments, the hydrocarbon-based fuel produced in the Fischer Tropsch reactor is upgraded in a hydrocracking unit and/or fractionation unit. The Fischer Tropsch reactor may produce synthetic paraffinic kerosene and/or diesel fuels as primary products, and light ends such as tail gas and/or naphtha produced as a byproduct are recycled to the gasification unit or the reactor (e.g., a reformer). The combination of these specific process steps, coupled with the addition of renewable hydrogen, provides a process having high carbon conversion efficiency as output streams that would normally be emitted are recycled to produce additional syngas.

Additionally, the present disclosure provides processes and systems for converting carbon dioxide and produced water to syngas using an electrolysis unit. In some embodiments, the system includes a high temperature co-electrolysis unit (HTCE). The HTCE unit may be configured to electrolyze $CO_2$ and $H_2O$ into additional syngas. The HTCE unit can convert $CO_2$ and water (e.g., the produced water from the Fischer Tropsch reactor) into additional syngas that can be used to produce additional hydrocarbons. For example, the system utilizes the HTCE unit to convert $CO_2$ emissions generated from the hydrocarbon synthesis processes in combination with water produced from the same processes to syngas. The syngas produced from the HTCE unit can also undergo Fischer Tropsch synthesis to produce more hydrocarbon-based fuels. Additionally, the added energy for the conversion (via co-electrolysis) into additional syngas can be provided from non-carbon based power sources (e.g., green energy sources) which results in reduced total overall GHG emissions with the conversion of the $CO_2$.

The systems and processes described herein can drastically reduce $CO_2$ emissions by incorporating renewable hydrogen in order to enrich the biomass derived syngas, as well as repurposing waste streams and byproducts to produce more hydrocarbon-based fuels per unit biomass converted. In some embodiments, the system may include a HTCE unit to convert produced water and $CO_2$ into hydrogen, carbon monoxide, and oxygen, a (reverse) water-gas-shift reactor to convert hydrogen, oxygen, and $CO_2$ into syngas, or combinations thereof. The systems and processes described herein beneficially contribute to the overall carbon efficiency of the process by providing a higher conversion of feedstock into useful product carbon associated to final liquid fuel products. Advantageously, the additional energy for converting $CO_2$ and produced water into syngas is offset by the improved carbon efficiency of the process as more liquid fuels are produced per unit of biogenic carbon fed to the process. In some embodiments, the additional energy for HTCE conversion of $CO_2$ and produced water into syngas is supplied from green energy sources, e.g., solar energy, wind power, hydrothermal power, etc. By utilizing green energy sources, no additional $CO_2$ emissions are added when converting $CO_2$ and water via direct electrolysis. In some embodiments, the present process preferably uses green energy through high efficiency HTCE electrolysis (95+% power efficiency) with potential for higher efficiency depending upon the heat available from the remainder of the system. The $CO_2$ and produced water—both unwanted byproducts from the hydrocarbon synthesis process—are converted to syngas and subsequently processed into additional hydrocarbon fuel.

Moreover, the process and system described herein utilizes renewable energy and converts byproducts (e.g., produced water and carbon dioxide gas) to provide a sustainable path to reduce the impact of GHGs on the environment by maximizing the biogenic carbon conversion efficiency and utilization of produced water to lower any emitted products. Furthermore, the process and system described herein introduces other non-food biomass feedstocks to replace the primary natural gas feedstock selected for conventional synfuels plant operations. In addition to the carbon and produced water usage advantages of the process, the potential for use of these alternate sources of low-cost biogenic carbon may be valuable in view of the uncertain pricing of natural gas in the longer term and site-specific availability of alternate non-food biomass materials.

In some embodiments, the present disclosure provides a system for producing a hydrocarbon-based fuel. The system includes a biomass feedstock processing unit. The biomass feedstock processing unit is configured to remove waste from a feedstock to produce a conditioned feedstock with controlled physical properties, hence suitable for combustion or gasification. The system includes a gasification unit in communication with the biomass feedstock processing unit. The gasification unit is configured to convert the processed feedstock into a crude syngas. The crude syngas includes carbon dioxide, carbon monoxide, hydrogen, and nitrogen alongside with tars and volatiles. In some embodiments, where pure oxygen is utilized, the crude syngas may not include nitrogen. The system includes a reactor downstream the gasification unit. The reactor is operated at suitable conditions to promote conversion of portions of the syngas to produce a proper ratio of hydrogen to CO with limited $CO_2$ concentration given the thermodynamically favorable operating conditions for the reverse water gas shift reaction. In some embodiments, the system may include a Heat Recovery Steam Generation (HRSG) system to cool down the hydrogen-enriched syngas. The system may include an acid gas scrubber configured to remove carbon dioxide from the syngas to produce a purified syngas having a hydrogen to carbon monoxide ratio of at least 1.5:1. In some embodiments, the purified syngas is further enriched by combining it with a hydrogen rich stream, preferably green hydrogen obtained by water electrolysis powered by renewable energy, so as to increase the ratio of $H_2$ to CO to at least 2:1. The hydrogen enriched syngas thus obtained is then routed to a Fischer Tropsch reactor, wherein the Fischer Tropsch reactor converts the purified syngas into Fischer-Tropsch liquids, water, and tail gas. The produced water from the Fischer Tropsch reactor can be combined with other water purges from the system and treated in a water treatment unit leading to a zero discharge and minimal water intake make up requirement, followed by an electrolysis unit that converts part of the purified water into an oxygen stream and a hydrogen stream. A portion or the whole of the oxygen stream produced from the electrolysis unit is recycled to the gasification unit, the autothermal reformer, or combinations thereof. In some embodiments, the system includes a reverse water-gas shift reactor. A portion of the carbon dioxide removed from the syngas in the scrubber is recycled to the reverse water-gas-shift reactor. In some embodiments, a portion of the hydrogen stream is provided to the reverse water-gas shift reactor. The reverse water-gas shift reactor is configured to produce carbon monoxide that is supplied to the Fischer Tropsch reactor. Alternatively, a portion of the said removed carbon dioxide combined with steam can be converted to additional $H_2$:CO ratio syngas in a $CO_2$ electrolysis unit. Depending on the configuration, the system can achieve at least 65% and up to 95% carbon conversion of the feedstock into liquid fuel products. In some embodiments, the syngas stream and the hydrogen stream are pressurized prior to being supplied to the Fischer Tropsch reactor. In some embodiments, the tail gas from the Fischer Tropsch reactor is recycled to the reformer. In some embodiments, the system includes a hydrocracker unit, a fractionation unit, isomerization unit, and other hydrocarbon processes, or combinations thereof, configured to upgrade the Fischer-Tropsch liquid into fuel, wherein a byproduct of the hydrocracker unit comprises tail gas, wherein a byproduct of the fractionation unit comprises naphtha. In some embodiments, the tail gas, naphtha, or both, are recycled to the reformer. In some embodiments, the system includes a flue gas scrubber configured to scrub any flue gas generated by the system. In some embodiments, the system includes a carbon dioxide treatment and compression system, wherein carbon dioxide produced from the scrubber and the flue gas scrubber is processed in the carbon dioxide treatment and compression system to produce a purified carbon dioxide stream, wherein the purified carbon dioxide stream is recycled to the reformer, the reverse water-gas shift reactor, the high temperature co-electrolysis unit, or combinations thereof. In some embodiments, the feedstock comprises one or more of railroad ties, greasewood, corn stover, orchard prunings, forest thinnings, slash, switch grass, wood chips, lignin, and cellulosic material. In some embodiments, the feedstock comprises woody biomass. In some embodiments, the system includes a pre-reformer and an autothermal reforming unit configured to convert a natural gas feedstock into syngas.

In some embodiments, the present disclosure provides a process for producing hydrocarbon-based fuels, which includes gasifying a biomass feedstock to produce a crude syngas stream comprising carbon dioxide, carbon monoxide, and hydrogen alongside with tars and volatiles; reforming the crude syngas stream to produce a hydrogen-enriched syngas stream; separating carbon dioxide from the hydrogen-enriched syngas stream in a separation unit to produce a carbon dioxide stream and a purified syngas stream having a hydrogen to carbon monoxide ratio of at least 1.5:1; combining the purified syngas stream with hydrogen derived from renewable sources so as to enrich the purified syngas to a hydrogen to carbon monoxide ratio of at least 2.1; reacting the purified and hydrogen enriched syngas stream in a Fischer Tropsch reactor to produce Fischer-Tropsch liquids, water, and tail gas; recycling the water produced from the Fischer Tropsch reactor to a zero discharge water treatment unit; and electrolyzing the purified water in the electrolysis unit to produce an oxygen stream and a hydrogen stream. In some embodiments, the process includes purifying the carbon dioxide stream generated from the separation unit to produce a purified carbon dioxide stream. In some embodiments, the process includes recycling the purified carbon dioxide stream to the gasification step, the reforming step, or combinations thereof. In some embodiments, the process includes recycling a portion of the oxygen stream and a portion of the hydrogen stream to the gasification step, the reforming step, or combinations thereof. In some embodiments, the process includes recycling a portion of the hydrogen stream and a portion of the purified carbon dioxide stream to a reverse water-gas-shift reactor and/or a $CO_2$ electrolysis unit. In some embodiments, the products (e.g., carbon monoxide) from the reverse water-gas-shift reactor and/or a $CO_2$ electrolysis unit may be fed to the Fischer Tropsch reactor to convert syngas into Fischer-Tropsch liquids. In some embodiments, the process includes processing natural gas in a reformer to produce a second crude syngas stream that is supplied to the Fischer Tropsch reactor. In some embodiments, the electrolysis unit is powered by solar energy, wind energy, hydroelectric energy, nuclear energy, or tidal energy. In some embodiments, the biomass feedstock comprises one or more of railroad ties, greasewood, corn stover, orchard prunings, forest thinnings, slash, harvesting residues, switch grass, wood chips, lignin, and cellulosic material. In some embodiments, the process includes treating the water produced from the Fischer Tropsch reactor to produce a boiler-quality feed water, wherein the boiler-quality feed water is electrolyzed in the electrolysis unit. In some embodiments, the water from the Fischer Tropsch reactor is treated to remove hydrocarbons and alcoholates.

Definitions and Descriptions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

As used herein, the meaning of "a," "an," or "the" includes singular and plural references unless the context clearly dictates otherwise.

As used herein, "carbon conversion efficiency" refers to the amount of carbon content in the feedstock that is converted into hydrocarbon fuel.

As used herein, "unit" refers to a part of a system, and may for example comprise a unit operation, a system, or group of unit operations.

As used herein, "stream" refers any fluid or solid moving, directly or indirectly, from one location to another.

As used herein, "syngas" may comprise a combination of carbon monoxide, hydrogen, carbon dioxide and possibly other components such as, without limitation, water vapor, sulfur- or nitrogen-containing compounds, methane and other alkanes, hydrocarbons, acid gases, halogens and particulates.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass both endpoints and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

Process Configuration

FIG. 1 shows a schematic diagram of a system for producing hydrocarbon fuels according to some embodiments of the present disclosure. The system 100 provides an overall system for producing hydrocarbon-based fuels with high carbon conversion efficiency. The system 100 provides a continuous process for converting biomass and, optionally natural gas, into synthesis gas ("syngas"). The syngas is ultimately converted to a hydrocarbon-based fuel, e.g., jet fuel, via hydrocarbon synthesis utilizing the Fischer Tropsch process and, optionally, fuel upgrading. As described above, the conversion of biomass to liquid is often referred to as "BTL" and the conversion of natural gas to liquid is often referred to as "GTL". In some aspects, the system incorporates both BTL and GTL processes to produce syngas.

In some embodiments, the system 100 may be configured to convert feedstock 105 (e.g., biomass) into hydrocarbon-based fuels. The system 100 may include a feedstock processing unit 110. The feedstock 105 may be supplied to the feedstock processing unit 110. In some embodiments, the feedstock processing unit 110 can be a biomass feedstock processing unit. The feedstock processing unit 110 is configured to separate materials from feedstock for additional processing. In some embodiments, the feedstock processing unit 110 is configured to adjust the feedstock physical properties, namely its moisture content and maximum particle size, as well as to separate unwanted materials from feedstock for additional processing. For example, non-biogenic derived carbon materials and non-carbonaceous materials (e.g., waste material) may be removed from the feedstock. In the feedstock processing unit 110, the waste material may be sized, separated, and processed to remove materials that are not useful in the process, or which might reduce its efficiency. For example, the feedstock processing unit 110 removes metals, inorganic materials, and other materials to produce a processed feedstock 115.

In some embodiments, the bulk of the feedstock comprises biomass (e.g., railroad ties or another cellulosic material) and, optionally, a small amount of natural gas. In some embodiments, the biomass feedstock may include corn stover, bagasse, switch grass, forest thinnings, slash, wood chips, lignin, or any other carbohydrate, cellulosic materials, or combinations thereof. In some embodiments, the biomass may comprise one or more of railroad ties, greasewood, corn stover, forest thinnings, slash, or orchard pruning.

The system 100 may include a gasification unit 120 that receives the processed feedstock 115. The gasification unit 120 can be a biomass gasification unit. The gasification unit 120 converts the processed feedstock 115 into a crude syngas stream 125. For example, the gasification unit 120 converts processed biomass into the crude syngas stream 125 by one or more steps of steam reformation, carbon oxidation, or gasification, and hydrocarbon reformation. The crude syngas stream 125 produced from the gasification unit 120 may include carbon monoxide, hydrogen, carbon dioxide, argon, nitrogen, tars, and volatiles.

The system 100 may include a high temperature, non-catalytic reforming unit 130 for the partial oxidation of methane and other hydrocarbons contained in the crude syngas stream 125 with an oxygen-containing gas. The crude syngas stream 125 produced is a high biogenic content syngas. In some embodiments, the reforming unit 130 comprises a partial oxidation reformer, a steam reformer, an autothermal reformer, or combinations thereof (although other reformer types can also be used). In some embodiments, the reforming unit 130 utilizes oxygen separated from air using cryogenic separation, pressure-swing absorption, membrane separation (e.g., ion-transport membrane, ITM), and combinations thereof. In some cases, the partial oxidation reformer utilizes an oxidizing gas selected from the group consisting of air, oxygen-enriched air, pure oxygen, and combinations thereof. The oxygen supplied to the reforming unit 130 can be pure oxygen to reduce the amount of energy needed to filter unwanted components (e.g., nitrogen from air). In some embodiments, the oxygen supplied to the reforming unit 130 is provided from the water electrolysis unit 155 as further discussed below. In some embodiments, the waste heat from the reforming unit 130 can be recovered in a waste heat recovery unit and recycled to the reforming unit 130 or other units in the system 100. In some embodiments, processed syngas stream 135 from the reforming unit 130 can be processed in a syngas conditioning unit for further purification of the syngas before being combined with green or renewable hydrogen and supplied to the Fischer Tropsch reactor.

In some embodiments, the processed syngas stream 135 can be pressurized in one or more compressor(s) 140. The compressor(s) 140 are configured to pressurize the processed syngas stream 135 to a predefined level to produce a compressed syngas stream 145. In some embodiments, the final pressure of the compressed syngas stream 145 may be in a range acceptable for the Fischer Tropsch synthesis process.

The compressed syngas stream 145 can be sent to a scrubber 150 to remove contaminants (e.g., carbon dioxide and other acid gases) prior to being supplied to the Fischer Tropsch reactor 180. In some embodiments, the scrubber 150 is a carbon dioxide scrubber. The scrubber 150 is configured to remove contaminants from the compressed syngas stream 145 to produce a purified syngas stream 151. For example, the scrubber 150 can remove carbon dioxide and other contaminants that can reduce performance of the Fischer Tropsch reactor. The scrubber 150 can receive the compressed syngas stream 145 and a solvent or a solution (e.g., an alkaline solution, an ammine, cold methanol or other) to absorb contaminants from the compressed syngas stream 145 by means of the reversible chemical absorption process. Loaded solvent from the absorber can be regenerated in a stripping unit where carbon dioxide gets released and the lean solvent recovered and circulated in closed circuit to the absorber.

The carbon dioxide stream 152 separated from the compressed syngas stream 145 can be supplied to a carbon dioxide treatment and compression system 160. The carbon dioxide treatment and compression system 160 can remove contaminants from the carbon dioxide stream 152 to produce purified carbon dioxide 165. The purified carbon dioxide 165 produced from the carbon dioxide treatment and compression system 160 can be either recycled to other units in the system 100 to produce additional syngas or routed to a $CO_2$ sequestration well. Within limits given by the mass and energy balance, the purified carbon dioxide 165 from the carbon dioxide treatment and compression system 160 can be recycled to the dry reforming unit 130, the RWGS reactor, the HTCE unit, or combinations thereof. This recycle stream utilizes carbon dioxide that would be typically emitted as flue gas, and reuses carbon dioxide to produce additional syngas.

In some embodiments, a portion of the purified carbon dioxide 166 from the carbon dioxide treatment and compression system 160 can be processed in a (reverse) water-gas-shift reactor 170. This $CO_2$ combined with $H_2$ 157 from the water electrolysis unit 155 yields a syngas stream 171 for further processing in the FT reactor system 180. In some embodiments, reverse water-gas-shift reactor 170 is a HyCOgen unit produced by Johnson Matthey. The reverse water-gas-shift reactor 170 converts recovered $CO_2$ and $H_2$ back to CO and $H_2O$ that can be used in the system 100. Purified and compressed syngas stream 151 from the carbon dioxide treatment and compression system 160 is also supplied to the FT reactor system 180 where is combined with other syngas input streams and $H_2$ 157 produced by the water electrolysis unit 155. In some embodiments, the targeted $H_2$/CO ratio may be in the range of 0.5 to 10.0.

The purified syngas stream 151 may be supplied to the Fischer Tropsch reactor 180 as either the main or only carbon-containing feedstock. In some embodiments, a secondary syngas stream 171 is also a feedstock for the Fischer Tropsch reactor 180. In addition, a fraction of the water electrolysis hydrogen production is also combined with the overall syngas stream for hydrocarbon synthesis. The Fischer Tropsch reactor 180 synthetically produces higher hydrocarbon liquids by catalytically converting syngas in a strongly exothermic process. Therefore, the FT reactor may require substantial heat removal, which is normally accomplished via medium pressure steam production from boiler feed water vaporization. The Fischer Tropsch reactor 180 produces a mixture of linear paraffinic hydrocarbon molecules, with carbon numbers varying between C1 and C30 or higher as the main product and produced water as a byproduct. The FT reaction is a heterogeneously catalyzed reaction, characterized by gas phase reactants and a combination of liquid and gaseous products which are separately collected as medium F-T liquid (MFTL) and heavy F-T liquid (HFTL), water, and F-T tail gas. The F-T tail gas 185, typically containing a mixture of unreacted hydrogen and carbon monoxide, as well as methane and $CO_2$ by-products of the reaction, can be recycled to other units in the system where can be reformed back to additional syngas. For example, the F-T tail gas 185 can be recycled to the reforming unit 130. In some embodiments, the system may include a hydrocracker unit 190 and/or fractionation unit 195 to upgrade the F-T liquids. For example, the hydrocracker unit 190 employs a high temperature, high pressure catalytic process that upgrades the HFTL and MFTL hydrocarbon streams 181 into a transportation fuel or a blending component meeting chemical and physical properties. The tail gas 191 produced from the hydrocracker unit 190 and the naphtha 196 produced from the fractionation unit 195 can be recycled to the system (e.g., to the reforming unit 130).

The system 100 includes a water electrolysis unit 155. The water produced from the aforementioned units (e.g., gasifier, Fischer Tropsch reactor, etc.) in the system 100 can be processed in a water treatment unit and then supplied to the water electrolysis unit 155. The water treatment unit can produce boiler-quality water that is supplied to the water electrolysis unit 155, as well as to several cooling or heat recovery systems whereby steam is produced. For example, the purified water stream 182 from the Fischer Tropsch reactor 180 can be supplied to the water electrolysis unit 155. The water electrolysis unit 155 can convert the purified water into an oxygen stream 156 and a hydrogen stream 157, which can be supplied to other units in the system 100. For example, the oxygen stream 156 produced from the water electrolysis unit 155 can be supplied to the gasification unit 120, the reforming unit 130, the reverse water-gas-shift reactor 170, or combinations thereof. In some embodiments, the oxygen stream 156 prior to being supplied to the reverse water-gas-shift reactor 170. The hydrogen stream 157 produced from the water electrolysis unit 155 can be supplied to the reverse water-gas-shift reactor 170. In some embodiment, the hydrogen stream 157 is compressed prior to being supplied to the reverse water-gas-shift reactor 170. The reverse water-gas-shift reactor 170 may be configured to provide a catalyzed process to convert hydrogen and $CO_2$ into carbon monoxide (CO), which is combined with additional hydrogen to form syngas. The syngas 171 produced from the reverse water-gas-shift reactor 170 can then be supplied to the Fischer Tropsch reactor 180 to produce additional hydrocarbon fuel.

In some embodiments, the electrolysis unit is powered by solar energy, wind energy, hydroelectric energy, nuclear energy, or tidal energy. In some embodiments, the process includes scrubbing the carbon dioxide stream in a carbon dioxide scrubber to produce purified carbon dioxide, wherein the purified carbon dioxide is electrolyzed in the electrolysis unit. In some embodiments, the process includes boiling the water produced from the Fischer Tropsch reactor to produce a boiler-quality feed water, wherein the boiler-quality feed water is electrolyzed in the electrolysis unit. In some embodiments, the process includes reacting the additional syngas in the Fischer Tropsch reactor to produce additional hydrocarbons. In some embodiments, the process includes sequestering additional $CO_2$ produced in the process.

In some embodiments, the approximate additional power for electrolysis of water produced in the system ranges from 30 MW to 80 MW per ton of hydrogen produced from the reverse fuel cell or electrolysis unit. If energy for electrolysis is supplied from a conventional energy source, e.g., natural gas, approximately 450 gr $CO_2$/kWh is generated in an "efficient" combined cycle mode. However, if green energy is employed (e.g., solar power), the $CO_2$ emissions associated with power generation is less than 100 gr $CO_2$/kWh, less than 90 gr $CO_2$/kWh, less than 50 gr $CO_2$/kWh, or less than 20 gr $CO_2$/kWh, with highly efficient sources as low 17.5 gr $CO_2$/kWh. With respect to $CO_2$ electrolysis, the power requirement may be from 0.05 to 0.80 MWh/ton, e.g., from 0.05 to 0.70 MWh/ton, from 0.10 to 0.70 MWh/ton, from 0.15 to 0.60, from 0.20 to 0.50 MWh/ton, from MWh/ton from 0.20 to 0.40 MWh/ton, or about 0.232 MWh/ton, and if power is supplied by green energy source as opposed to conventional natural gas sources, there is again a reduction in overall $CO_2$ emissions.

Electric power generated on site (either by using steam generated on site to power steam turbine generators or by installing Solar or Wind turbine power generation) may be used for a source of power to drive electrolysis of water to produce portions of the hydrogen and oxygen needed for plant process operations. Additional hydrogen, beyond what is available in the biomass feedstock is required in the biomass gasification, conversion to liquids and associated cleanup processes. Since the electrolysis process splits water into its components of hydrogen and oxygen, it provides some of the oxygen needed in overall plant operations. In some embodiments, the processes and systems described herein use renewable energy resources (e.g., solar, wind, etc.) to provide power for individual units in the system. Additionally, waste heat is recovered where economically viable to generate electric power for reuse in the system.

Figure 2:
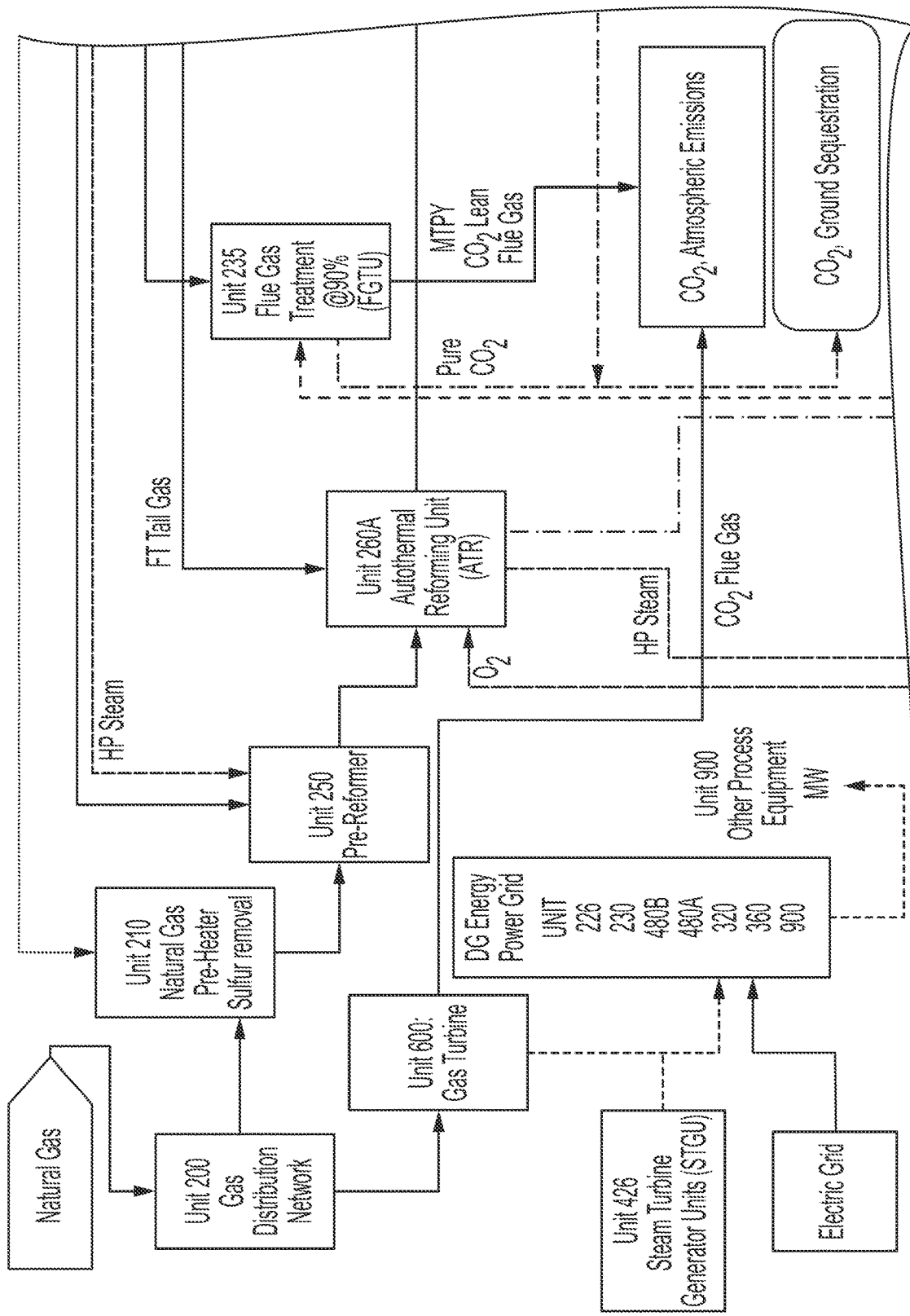
FIG. 2 shows a schematic diagram of a hydrocarbon synthesis process integrated with a $CO_2$ electrolysis unit according to some embodiments of the present disclosure.
Figure 2:
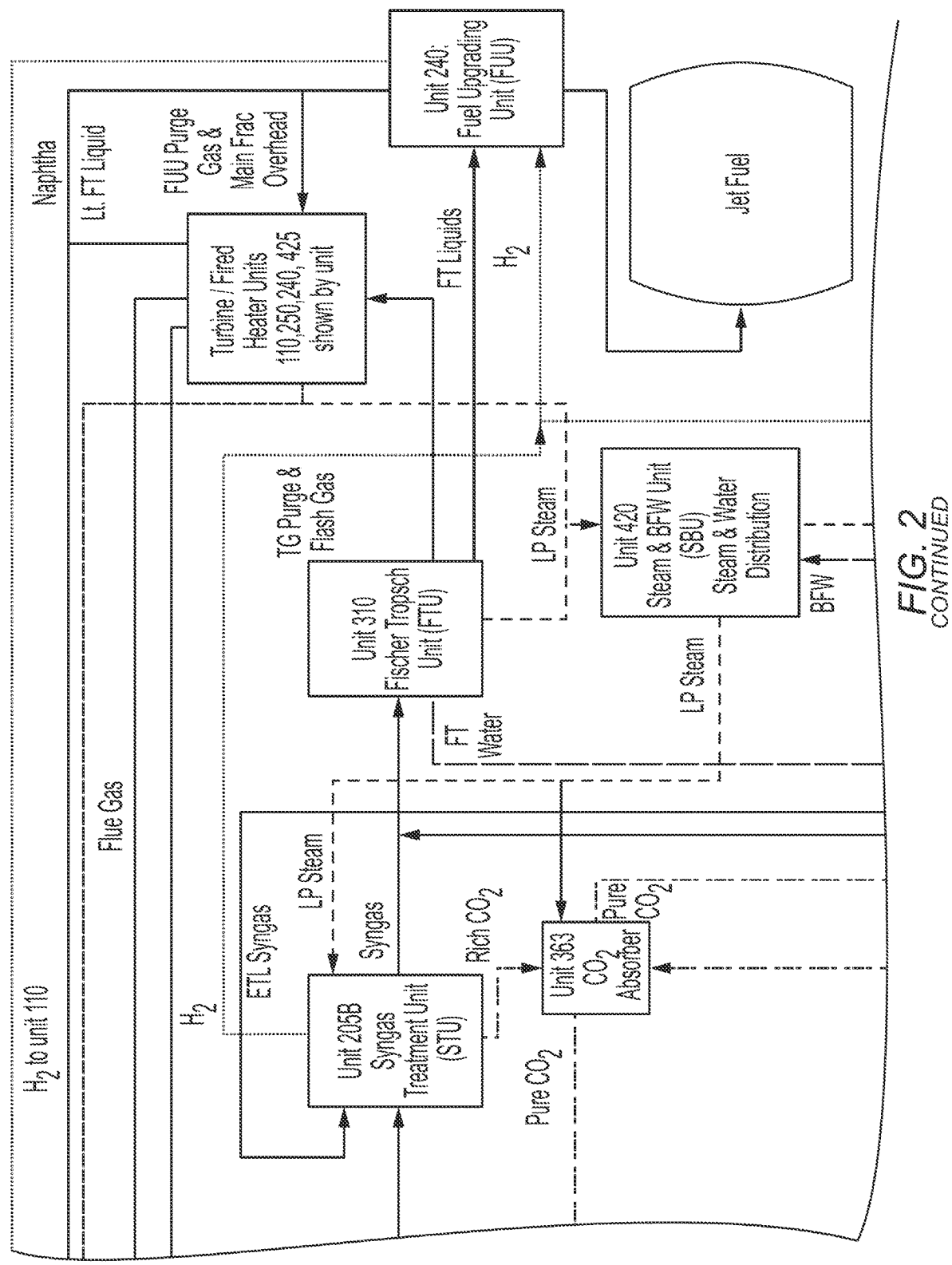
Figure 2:
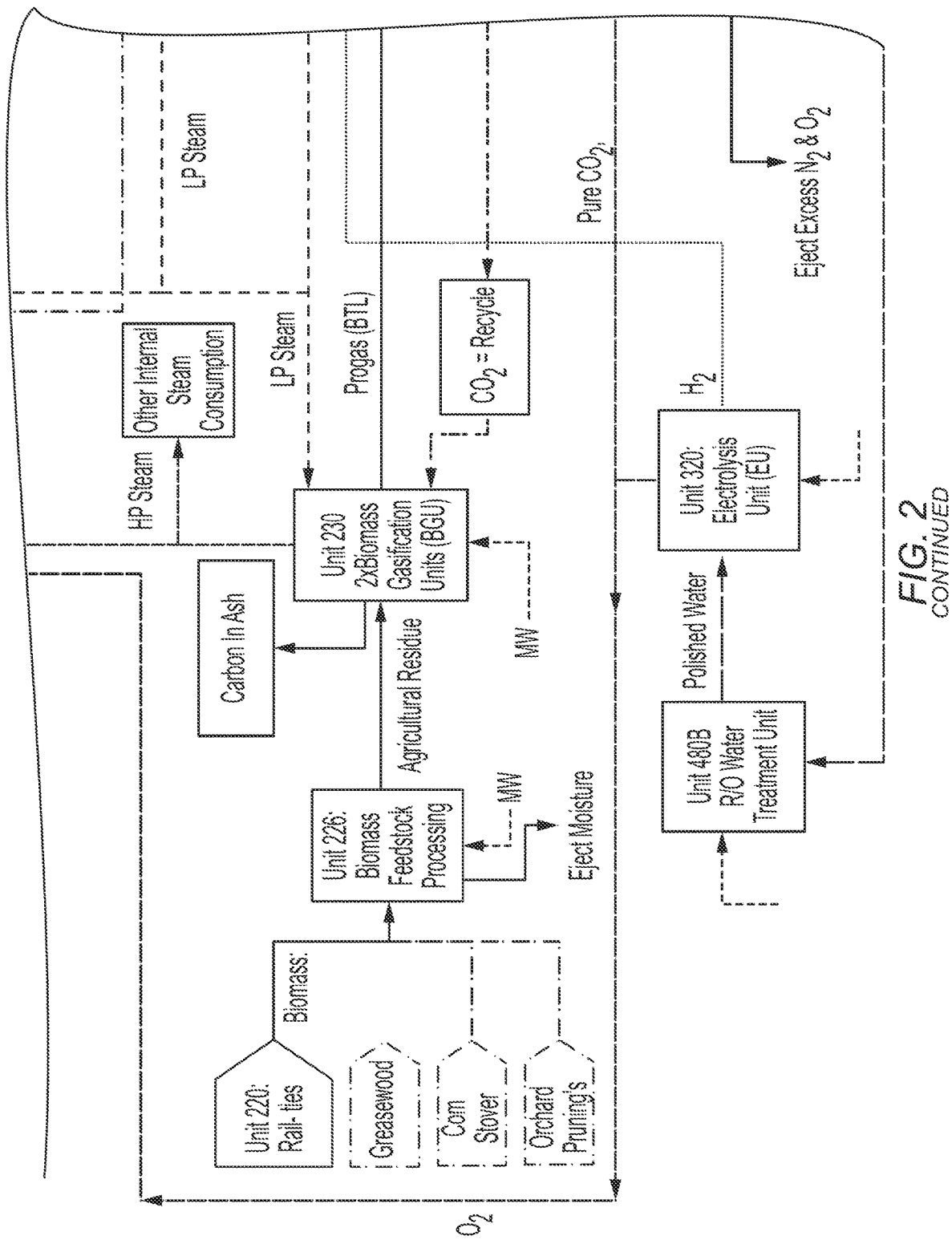
Figure 2:
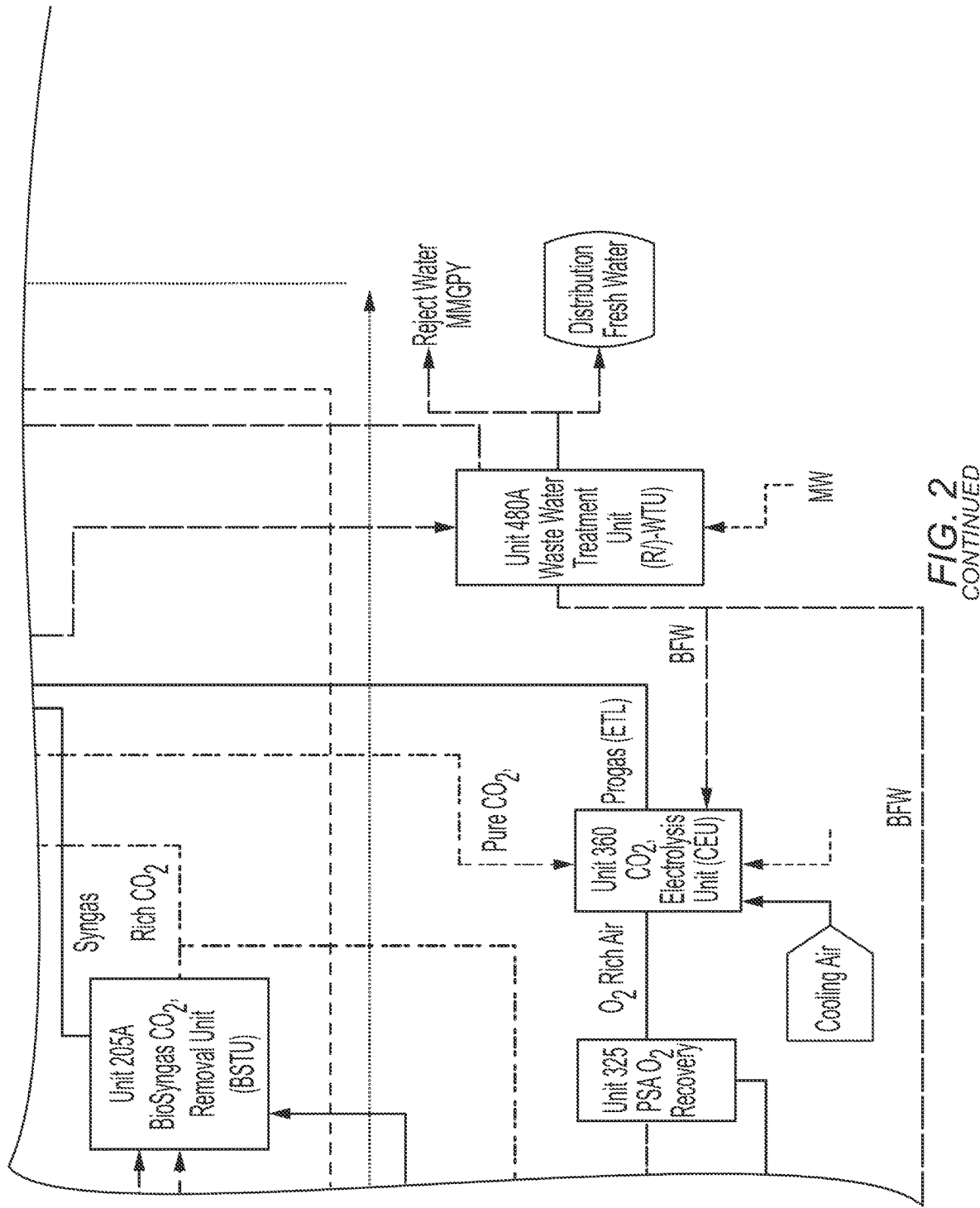

FIG. 2 shows a schematic diagram of a hydrocarbon synthesis process integrated with a $CO_2$ electrolysis unit in accordance with some embodiments of the present invention. As shown in FIG. 2, the process incorporates both BTL and GTL processes to produce syngas. As discussed herein, a system and process are disclosed for the combustion of a wide variety of hydrocarbon feedstocks to produce thermal energy, liquid fuels, and other valuable products with little or no emissions. The hydrocarbon and solid carbon-containing feeds, such as natural gas and biomass, are processed, through reforming and gasification and oxidation respectively, in order to produce syngas. The syngas is fed to a Fischer Tropsch synthesis process for conversion into hydrocarbons and optionally upgraded to form fuels, e.g., diesel fuel or other liquid hydrocarbons. The present system/process minimizes environmental emissions by employing an electrolysis unit to reduce $CO_2$ emissions while at the same time improving overall carbon efficiency and forming additional hydrocarbons. The electrolysis process preferably is at least partially powered by green energy.

In some embodiments, the bulk of the feedstock comprises biomass (e.g., railroad ties or another cellulosic material) and, optionally, a small amount of natural gas. In some aspects, the biomass feedstock may include switch grass, forest thinnings, slash, wood chips, lignin, or any other carbohydrate and/or cellulosic materials. The biomass may comprise one or more of railroad ties, greasewood, corn stover, forest thinnings, slash, or orchard prunings. For example, Unit 220 (Biomass Feedstock) provides a biomass feedstock that is gasified to form syngas.

As shown in FIG. 2, natural gas is supplied to the system via Unit 200 (Gas Distribution Network). The natural gas from Unit 200 may be split into a portion for conversion to hydrocarbon-based fuels ("feed natural gas" sent to Unit 210) and a portion for turbine-based electricity ("power natural gas" sent to Unit 500). A natural gas pre-heater and Unit 210 (e.g., sulfur removal unit) heats the natural gas and removes sulfur-containing compounds to provide a natural gas feedstock that is utilized to produce syngas. The amount of natural gas for turbine-based electricity varies depending on the amount of green energy, e.g., solar energy, available for the process. In some embodiments, at least 20 MW, e.g., at least 40 MW or at least 60 MW, of solar power is available for an 8-hour period to supplement the total electric power requirement, which may range from 50 to 200 MW, e.g., from 50 to 200 MW, from 60 to 180 MW, from 75 to 160 MW, from 80 to 150 MW, from 90 to 140 MW, from 100 to 130 MW, or about 128.15 MW. Geographic considerations may impact the supplemental green energy requirements. In some embodiments, the green energy source may be one or more of wind energy, hydroelectric energy, nuclear energy, tidal energy, or another source of green energy. In some embodiments, additional natural gas is utilized in the process to provide electricity during the production process, e.g., 16-hr period, when direct green energy, e.g., solar energy, is not available.

As discussed above, Unit 200 provides a natural gas distribution network that distributes the natural gas to Unit 210 and/or Unit 500. This configuration advantageously minimizes the capital for solar energy storage in the process. In some aspects, the process produces synthetic jet fuel with at least 20% less, e.g., at least 40% less, or at least 60% less, overall $CO_2$ emission than the emissions associated with conventional refining of crude oil. As will be appreciated, there are numerous variations in this configuration based on the amount of natural gas, amount of solar power, and selection of the fraction of natural gas and biomass in the feed.

Referring back to Unit 210, the natural gas feedstock is combined with the gas phase products (e.g., unconverted $H_2$ and CO) and $H_2$ (produced via electrolysis in Unit 320) in this particular configuration. In some embodiments, the natural gas feedstock is combined with the gas phase products and $H_2$ in Unit 260A (Autothermal Reforming Unit) to produce syngas, which is subsequently fed to Unit 205B (Syngas Treatment Unit). As shown, a $CO_2$ rich stream is optionally directed from the syngas treatment unit 205B to Unit 363 ($CO_2$ absorber unit), described in more detail below. The syngas that is converted to hydrocarbons in Unit 310 (Fischer Tropsch Unit) comprises light hydrocarbons produced via Fischer Tropsch synthesis and undergoes upgrading (e.g., a hydrocracking and/or isomerization step) in Unit 240 to produce the final product, e.g., synthetic jet fuel. Other configurations can use $H_2$ derived from $CO_2$ electrolysis in Unit 360 ($CO_2$ Electrolysis Unit), or more conventional methods based on $H_2$ separation from the effluent syngas from either the reforming unit 260A or gasification unit 230.

In some embodiments, Unit 210 (Natural Gas Feedstock) produces an effluent that is directed to the reformer, Unit 260A. In some aspects, Unit 260A is an Autothermal Reforming Unit (ATR). The ATR converts the effluent from Unit 210, with steam and oxygen, to produce syngas. This syngas may comprise undesirable constituents such as, e.g., reactive nitrogen and undesirably high levels of $CO_2$. Typically, syngas treatment comprises removal units for removing or converting these undesirable constituents. In some embodiments, the $H_2$/CO ratio is in the range of 0.5 to 10.0.

In some embodiments, biomass is delivered in Unit 220 (Biomass Feedstock) and processed in Unit 225 (Biomass Feedstock Processing) for size reduction and water removal. The treated biomass then undergoes gasification using any suitable conversion technology which is energy efficient, minimizes $CO_2$ and produces a suitable syngas with respect to the $H_2$/CO ratio, e.g., typically from 0.5 to 1.0, e.g., 0.55, 0.60, 0.65, 0.70, 0.75, 0.80, 0.85, 0.90, 0.95, or 1.0. In some embodiments, the $H_2$/CO ratio is in the range from 0.8 to 1.0. Biomass gasification produces large amounts of $CO_2$ due to the high oxygen content of the feed. Consequently, the biomass derived syngas passes through Unit 205A ($CO_2$ Removal Unit). The $CO_2$ is then passed through Unit 363 ($CO_2$ Absorber Unit) to remove the trace hydrocarbons and CO which is contained in the scrubbed $CO_2$ to produce purified $CO_2$.

The resulting syngas, with greatly diminished $CO_2$ content, is then combined with the syngas from unit 205B and hydrogen from unit 320 (water electrolysis unit), with the combined syngas sent to Unit 310 for Fischer Tropsch synthesis. After Fischer Tropsch synthesis, the products comprise a range of hydrocarbons—from methane to heavy waxes—with the heaviest alkanes having boiling points in excess of 800° F. (427° C.). In some embodiments, the light hydrocarbons (typically $C_1$ to $C_8$) as well as the unreacted syngas is sent to Unit 425 (Turbine/Heater) where a fraction of the product is used as fuel, e.g., for a turbine and process fired heaters (i.e., Units 110, 250, 260A and 240). In some embodiments, the remaining product that is not used as fuel, is recycled back to Units 250 and 260A for conversion to additional syngas.

In some embodiments, the heavier Fischer Tropsch products ($C_{9+}$) are sent to the Unit 240 (Fuel Upgrading Unit) and combined with $H_2$ for processing into the final hydrocarbon products, e.g., jet fuel or diesel products, via hydroprocessing. In Unit 240, some material may be converted to light hydrocarbons contained in the Fuel Upgrading Unit purge gas which is combined with the Fischer Tropsch purge gas and recycled to generate further syngas.

$CO_2$ Generation

FIG. 2 shows exemplary $CO_2$ emissions for various units in the hydrocarbon synthesis process. In some embodiments, the major $CO_2$ generation sources in the above process/system are as follows:

Natural gas turbine flue gas (Unit 500);
Process Heater flue gas (Unit 425);
$CO_2$ removed from biomass derived syngas (Unit 205A); and
ATR derived syngas (Unit 205B).

In the above configuration of the process/system, the $CO_2$ generated via the natural gas turbines directly emitted as flue gas (Unit 500) is the largest source of $CO_2$ emissions. Unit 500 is responsible for a bulk of the atmospheric emissions as shown in the central highlighted box of FIG. 2. The second largest source of $CO_2$ emissions is the $CO_2$ removed from the biomass derived syngas (Unit 205A). The $CO_2$ emissions from Unit 205A constitutes the bulk of the sequestered $CO_2$. The flue gas $CO_2$ (from the internally generated fuel gas) passes through a treatment system (Unit 235) to capture additional $CO_2$ for sequestration. The uncaptured $CO_2$ from Unit 235 adds a small fraction to atmospheric emissions. In some embodiments, a fraction of the total $CO_2$ generated is transferred to the $CO_2$ electrolysis unit 360 and subsequently converted to syngas through the consumption of electric power.

Integration of $CO_2$ and Water Electrolysis

As discussed herein, in some embodiments, the present invention provides a process for converting carbon dioxide and produced water to syngas in a hydrocarbon production process. The process may include processing natural gas in an autothermal reforming unit to form a first syngas stream, processing a biomass feedstock in a gasification unit to form a second syngas stream, treating the first and second syngas streams in a syngas treatment unit to produce a feed syngas stream, wherein the syngas treatment unit removes carbon dioxide from either or both the first and second syngas streams, reacting the feed syngas stream in a Fischer Tropsch reactor to produce hydrocarbons and water, and electrolyzing the carbon dioxide and water (e.g., after purification) in an electrolysis unit to produce carbon monoxide and hydrogen, which can be sent to the FT reactor. In some aspects, the electrolysis unit is powered by a green energy source. The green energy source may comprise one or more of solar energy, wind energy, hydroelectric energy, nuclear energy, or tidal energy. In some embodiments, at least 40 MW of solar power is supplied to the electrolysis unit over an 8-hour period.

In some aspects, the process further comprises scrubbing the carbon dioxide removed from the syngas treatment unit in a carbon dioxide scrubber to produce purified carbon dioxide, wherein the purified carbon dioxide is electrolyzed in the electrolysis unit. In some aspects, the process further comprises treating (e.g., boiling) the produced water from the Fischer Tropsch reactor to produce a boiler-quality feed water, wherein the boiler-quality feed water is electrolyzed in the electrolysis unit to produce carbon monoxide. In some aspects, the process further comprises sending the carbon monoxide to the Fischer Tropsch reactor to produce additional hydrocarbons.

When applying GTL and BTL technology for hydrocarbon synthesis, the amount of total $CO_2$ emissions is dependent on many factors. For example, the amount of total $CO_2$ emissions is primarily dependent upon the natural gas and biomass feed rates, carbon conversion efficiency, as well as the $CO_2$ emissions associated with the electric power for the conversion process. In some aspects, the carbon conversion efficiency can be relatively low allowing for a significant fraction of the feed stock energy to be converted to electric power through combustion processes. However, in this scenario, the total $CO_2$ emissions can be relatively high unless the process utilizes a non-fossil fuel source such as, e.g., a biomass. Unless $CO_2$ sequestration is employed to mitigate $CO_2$ emissions, the total $CO_2$ emissions associated with power and fuel production can exceed total allowable $CO_2$ emission thresholds.

In some embodiments, the present invention utilizes green energy, e.g., solar energy, as a source of electric power to provide energy for the conversion of $CO_2$ into synthesis gas and subsequently into transportation fuels. Many process configurations are contemplated to demonstrate that electrolysis of $CO_2$ and produced water into synthesis gas and subsequent conversion into transportation fuels reduces overall $CO_2$ emissions. For example, sequestering of the $CO_2$ can be co-applied to the $CO_2$ mitigation. However in many locations of the process, sequestration may not be a viable option due to the requirements for a pipeline or relatively low-cost transportation vector. The conversion of $CO_2$ and steam to syngas affords the opportunity to use electricity to convert the carbon and hydrogen in unwanted byproducts into transportation fuels (energy storage). The $CO_2$ emissions associated with this added electric power for conversion is considerably less than the $CO_2$ which would otherwise be emitted without the electrolysis system.

FIG. 2 shows two potential sources for $CO_2$/water electrolysis. In some embodiments, Unit 360 co-processes $CO_2$ and water to produce syngas and oxygen, while Unit 320 processes only water to make $H_2$ and $O_2$. In some embodiments, Unit 320 can provide a source of $H_2$ for the process. Alternatively, $H_2$ can be separated from the ATR syngas using recovery techniques. The trade-offs between the source for $H_2$ involves the preferences for the carbon balance and energy consumption.

In some embodiments, the system described herein includes a partial oxidation reformer to convert natural gas to synthetic gas comprising hydrogen and carbon monoxide, a biomass gasifier to convert various types of biomass materials into a synthetic gas containing primarily hydrogen and carbon monoxide, an electrolysis unit to convert water to yield hydrogen and oxygen gases, an optional desalination system to provide purified water to the electrolysis unit, a reverse water-gas shift reactor to convert carbon dioxide and hydrogen into carbon monoxide and water, a syngas processing system to condition and purify the syngas, a Fischer-Tropsch reactor for converting synthetic gases to liquid hydrocarbon fuels, and a fuel upgrading system to further remove carbon dioxide from the liquid hydrocarbon fuels. The system may include solar panels to convert sunlight into electrical power to provide power to units in the system (e.g., the electrolysis unit) and a steam turbine generator system for production of electric power from waste heat of gasification and gas-to-liquids conversion systems. The system recycles naphtha and/or carbon dioxide produced in natural gas and biomass to liquids processes to the partial oxidation gasifier for conversion to liquid fuels. In some embodiments, the (reverse) water-gas shift reactor can be replaced with a carbon dioxide electrolysis system to convert carbon dioxide to syngas, which is sent to the Fischer Tropsch reactor to produce additional liquid hydrocarbon fuels. Both of these options for recycling $CO_2$ have an impact of the electric power required. The reverse water gas shift alternative increases the consumption of hydrogen which is produced via water electrolysis whereas the $CO_2$ electrolysis is a direct consumer of electric power. Therefore, a trade-off between the overall carbon efficiency of the system and the power input per unit synthetic fuel produced. Depending on the carbon intensity of the power available, $CO_2$ recycling via one or other option may be more or less attractive from a synthetic fuel carbon intensity point of view.

EXAMPLE

The $CO_2$ emissions can be compared for each of the BTL and GTL process configurations by using the Green House Gas emission factor (GHG-$CO_2$), which can be measured by methods known to one skilled in the art. As shown in Table 1, in conventional refinery operations, the amount of $CO_2$ emitted per megajoule (MJ) of fuel energy is typically from 50 to 500 $CO_2$/MJ fuel produced, or approximately 89.12 gr $CO_2$/MJ fuel produced. This is sometimes referred to as the $CO_2$ life cycle assessment. There are numerous factors contributing to the total $CO_2$ emissions per unit of fuel energy as shown in Table 1. For example, factors such as the biogenic uptake, upstream biomass, process solar emissions, natural gas turbine emissions, among others, each contribute to the $CO_2$ emissions per unit value of product energy, e.g., SPK. In the BTL/GTL process shown in FIG. 2, the major contributors to $CO_2$ emissions include the actual combustion of the SPK and the electric energy associated with the natural gas turbines.

It has now been discovered that the inclusion of $CO_2$ sequestration with $CO_2$/water electrolysis, e.g., Unit 360, leads to a substantial reduction of the overall $CO_2$ emissions when compared to conventional refinery practices. See Table 1 (89.12 gr $CO_2$/MJ SPK in Baseline Petroleum Fuel; 59.84 gr $CO_2$/MJ SPK in Baseline operation which uses natural gas turbine electric power and $CO_2$ electrolysis combined with $CO_2$ sequestration). In this scenario, the primary $CO_2$ reduction is due to the larger amount of $CO_2$ undergoing sequestration 323,970 MTPY (metric tons per year) as compared to the amount of $CO_2$ undergoing electrolysis (148,900 MTPY). The use of flue gas scrubbers to capture $CO_2$ from the combustion process (Unit 235) also helps mitigate the overall $CO_2$ emission levels, especially when the energy for $CO_2$ capture is in the range of 700-800 kcal/kg $CO_2$ collected.

In one embodiment, the present invention uses solar energy to reduce the total electric power generation from the natural gas turbine to further mitigate the GHG-$CO_2$ emissions by reducing the total $CO_2$ emissions associated with power generation. For example, Table 1 provides the operation with natural gas turbines and 40 MW of solar power compared to Baseline Petroleum Fuel. In some embodiments, providing solar energy at 40 MW for 8 hr/day further reduces the overall $CO_2$ emissions by over 60% compared to the petroleum base line (33.9 gm $CO_2$/MJ fuel compared to the 89.12 gm $CO_2$/MJ fuel value in the base line case). This reduction is due to the low GHG-$CO_2$ emissions associated with solar power (e.g., less than 100 gm $CO_2$/kwh, less than 50 gm $CO_2$/kwh, or less than 20 gm $CO_2$/kwh, optionally on the order of 17.5 gm $CO_2$/kwh) as compared to the $CO_2$ emissions from natural gas turbines, which can be as high as 420 gm $CO_2$/kwh. For example, the average $CO_2$ emissions from power generated on the US Grid is in the range of 500-600 gm $CO_2$ emitted per kwh. Solar, wind and hydroelectric is considerably less, e.g., in the range of 17.5 to 90 gm $CO_2$ emitted per kwh. Consequently, supplying this electric power from green sources allows for the added production of product while reducing the overall GHG-$CO_2$ emissions to the levels (30-60% less than conventional refineries which are in the range of 89.12 gm $CO_2$/MJ fuel).

TABLE 1

| Life Cycle Component | Baseline Petroleum Fuel (gCO$_2$e/MJ) | Operation (gCO$_2$e/MJ for 24 h NG Power) | Operation (gCO$_2$e/MJ for 16/8 h NG Power and 40 MW Solar) |
|---|---|---|---|
| Biogenic Uptake | | −164 | −164 |
| Upstream Process Carbon NG | 8.00 | 27.9 | 23.62 |
| Upstream Biomass | | 1.4 | 1.4 |
| Process Solar Emissions | | — | 1.54 |
| NG Turbine Emissions | 7.00 | 119 | 97.8 |
| Process Emissions with Scrubber | | 3.64 | 3.64 |
| Transportation/Distribution | 1.00 | 1 | 1 |
| Jet Combustion | 73.16 | 70.3 | 70.3 |
| Total | 89.16 | 59.84 | 33.9 |
| Reduction (%) | | 32.88% Less | 61.98% Less |

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the invention and portions of various embodiments and various features recited below and/or in the appended claims may be combined or interchanged either in whole or in part. In the foregoing descriptions of the various embodiments, those embodiments which refer to another embodiment may be appropriately combined.

We claim:
1. A system for producing a hydrocarbon-based fuels, the system comprising:
 a biomass feedstock processing unit configured to remove waste from a feedstock to produce a processed feedstock;
 a gasification unit in communication with the biomass feedstock processing unit, wherein the gasification unit is configured to convert the processed feedstock into syngas comprising carbon dioxide, carbon monoxide, and hydrogen;

a reactor downstream from the gasification unit, wherein the reactor is operated at suitable conditions to promote conversion of portions of the syngas to produce a proper ratio of hydrogen to CO;

a scrubber in communication with the reactor, wherein the scrubber removes carbon dioxide from the syngas to produce a purified syngas having a hydrogen to carbon monoxide ratio of at least 1.5:1;

a Fischer Tropsch reactor for receiving the purified syngas, wherein the Fischer Tropsch reactor converts the purified syngas into Fischer-Tropsch liquids, water, and tail gas;

an electrolysis unit configured to receive the water from the Fischer Tropsch reactor, wherein the electrolysis unit converts the water into an oxygen stream and a hydrogen stream; and a reverse water-gas shift reactor, wherein a portion of the carbon dioxide removed from the syngas in the scrubber is recycled to the reverse water-gas shift reactor;

wherein a portion of the oxygen stream is recycled to the gasification unit, the reactor, or combinations thereof; and wherein the system achieves at least 90% carbon conversion of the processed feedstock.

2. The system of claim 1, wherein a portion of the hydrogen stream produced by the electrolysis unit is provided to the reverse water-gas shift reactor, wherein the reverse water-gas shift reactor is configured to produce carbon monoxide that is supplied to the Fischer Tropsch reactor.

3. The system of claim 2, wherein the syngas streams and the hydrogen stream are pressurized prior to being supplied to the Fischer Tropsch reactor.

4. The system of claim 1, wherein the tail gas from the Fischer Tropsch reactor is recycled to the reactor.

5. The system of claim 1, further comprising a hydrocracker unit, a fractionation unit, an isomerization unit, or combinations configured to upgrade the Fischer-Tropsch liquids into fuel, wherein a byproduct of the hydrocracker unit comprises tail gas, wherein a byproduct of the fractionation unit comprises naphtha.

6. The system of claim 5, wherein the tail gas, naphtha, or both, are recycled to the reactor.

7. The system of claim 1, further comprising a flue gas scrubber configured to scrub any flue gas generated by the system, wherein the reactor is a dry reformer.

8. The system of claim 7, further comprising a carbon dioxide treatment and compression system, wherein carbon dioxide produced from the scrubber and the flue gas scrubber is processed in the carbon dioxide treatment and compression system to produce a purified carbon dioxide stream, wherein the purified carbon dioxide stream is recycled to the dry reformer, the reverse water-gas shift reactor, a $CO_2$ electrolysis unit, or combinations thereof.

9. The system of claim 1, wherein the feedstock comprises one or more of railroad ties, greasewood, corn stover, orchard prunings, forest thinnings, slash, switch grass, wood chips, lignin, and cellulosic material.

10. The system of claim 1, wherein the feedstock comprises woody biomass.

11. The system of claim 1, further comprising a pre-reformer and an autothermal reforming unit configured to convert a natural gas feedstock into syngas.

12. The system of claim 1, further comprising a $CO_2$ electrolysis unit configured to convert a portion of the carbon dioxide and water removed from the system into carbon monoxide and hydrogen.

13. A process for producing a hydrocarbon-based fuel, the process comprising the steps of:

gasifying a biomass feedstock to produce a syngas stream comprising carbon dioxide, hydrogen, and carbon monoxide;

reforming the syngas stream to produce a hydrogen-enriched syngas stream;

separating carbon dioxide from the hydrogen-enriched syngas stream in a separation unit to produce a carbon dioxide stream and a purified syngas stream having a hydrogen to carbon monoxide ratio of at least 1.5:1;

enriching the purified syngas with additional hydrogen;

reacting the purified syngas stream and hydrogen enriched syngas stream, in a Fischer Tropsch reactor to produce Fischer-Tropsch liquids, water, and tail gas;

recycling a portion of the water from the Fischer Tropsch reactor to an electrolysis unit;

electrolyzing the water in the electrolysis unit to produce an oxygen stream and a hydrogen stream; and recycling a portion of the hydrogen stream and a portion of the carbon dioxide stream to a reverse water-gas-shift reactor to produce carbon monoxide.

14. The process of claim 13, further comprising purifying the carbon dioxide stream generated from the separation unit to produce a purified carbon dioxide stream, recycling the purified carbon dioxide stream to the reforming step.

15. The process of claim 13, further comprising recycling a portion of the oxygen stream and a portion of the hydrogen stream to the gasification step, the reforming step, or combinations thereof.

16. The process of claim 13, further comprising processing natural gas in a reforming unit to produce a second syngas stream that is supplied to the Fischer Tropsch reactor.

17. The process of claim 13, wherein the electrolysis unit is powered by solar energy, wind energy, hydroelectric energy, nuclear energy, or tidal energy.

18. The process of claim 13, further comprising treating the water from the Fischer Tropsch reactor to produce purified water, wherein the purified water is electrolyzed in the electrolysis unit.

* * * * *